United States Patent [19]

Cabernoch et al.

[11] Patent Number: 4,558,792
[45] Date of Patent: Dec. 17, 1985

[54] CONTAINER SUCH AS A NURSING CONTAINER, WITH FLEXIBLE LINER AND ACCESS SITE AND METHOD OF MAKING SAID ACCESS SITE

[75] Inventors: James L. Cabernoch, Cary; Leonard A. White, Gurnee, both of Ill.

[73] Assignee: Baxter Travenol Laboratories, Inc., Deerfield, Ill.

[21] Appl. No.: 599,412

[22] Filed: Apr. 12, 1984

[51] Int. Cl.$^4$ .............................. A61J 9/04; A61J 9/00
[52] U.S. Cl. .................................. 215/11 R; 215/11 C; 215/11 E
[58] Field of Search ................. 215/11 R, 11 D, 11 E; 220/403, 404, 413

[56] References Cited

U.S. PATENT DOCUMENTS

| | | | |
|---|---|---|---|
| 2,511,481 | 6/1950 | Schneider | 220/404 X |
| 2,519,986 | 6/1949 | Trout. | |
| 2,679,336 | 10/1950 | Frick. | |
| 2,807,384 | 9/1957 | Lipari | 215/11 R |
| 2,885,104 | 10/1956 | Greenspan. | |
| 3,015,410 | 1/1962 | Everett et al. | 220/404 X |
| 3,117,874 | 1/1964 | Horan | 215/11 R X |
| 3,204,855 | 4/1963 | Boynton et al. | |
| 3,255,923 | 2/1964 | Soto. | |
| 3,289,874 | 12/1966 | Dailey et al. | 215/11 C |
| 3,334,764 | 8/1967 | Fouser | 215/11 R |
| 3,386,604 | 6/1968 | Fields | 215/11 E |
| 3,519,157 | 5/1964 | Meierhoefer. | |
| 3,537,225 | 11/1970 | Fields | 493/210 |
| 3,586,196 | 6/1971 | Barton | 215/11 |
| 3,746,198 | 7/1973 | Howland | 215/11 R |
| 3,777,925 | 12/1973 | Eckholm. | |
| 3,834,570 | 9/1974 | Barr | 220/403 X |
| 3,838,784 | 10/1974 | Barton et al. | 215/11 R |
| 3,871,542 | 3/1975 | Hammer | 215/11 E |
| 3,900,548 | 8/1975 | Wiley. | |
| 3,926,706 | 12/1975 | Reinfenhauser et al. | |
| 3,936,334 | 2/1976 | Kushida et al. | |
| 3,977,153 | 8/1976 | Schrenk. | |
| 4,107,362 | 8/1978 | Valyi. | |
| 4,193,506 | 3/1980 | Trindle et al. | 215/11 C |
| 4,244,914 | 1/1981 | Ranalli et al. | |
| 4,286,047 | 8/1981 | Bennett et al. | |
| 4,450,028 | 5/1984 | Vilutis. | |

FOREIGN PATENT DOCUMENTS 678359   1/1964  Canada.
1347668  2/1974  United Kingdom.

Primary Examiner—Steven M. Pollard
Attorney, Agent, or Firm—Robert M. Barrett; Bradford R. L. Price; Paul C. Flattery

[57] ABSTRACT

A container is disclosed having a semi-rigid or rigid shell, a co-extensive flexible liner weakly or temporarily adhered to the shell and an access site defined in the container wall to which an access assembly may be attached. The access site is preferably defined by an annular fold in the container wall which tightly captures the liner to provide a mechanical peripheral seal between the shell and liner around the access site to prevent leakage of liquid, into the area between the shell and liner. The container is particularly useful as a nursing container, including a nipple access site with an attached nipple assembly.

24 Claims, 15 Drawing Figures

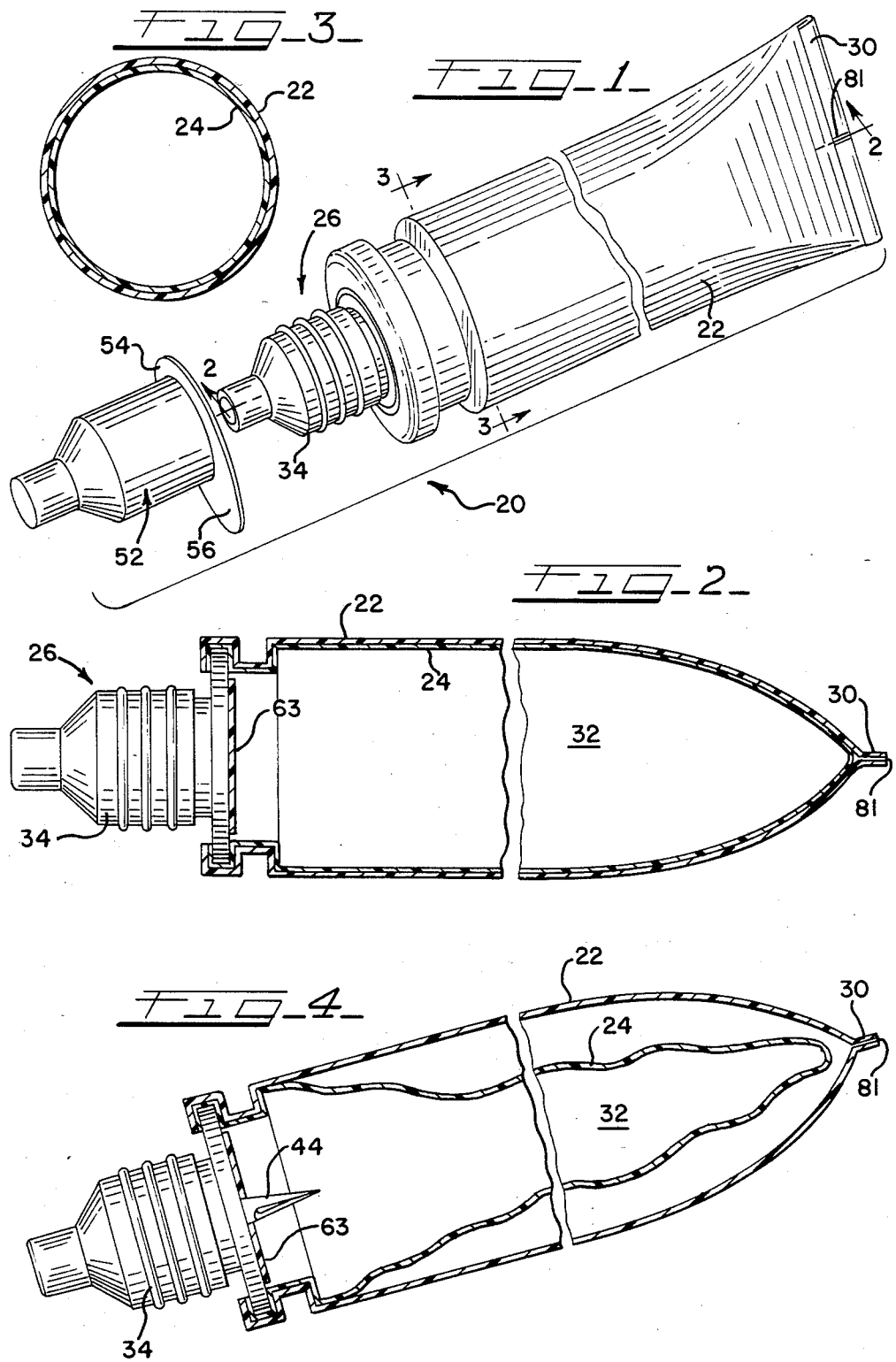

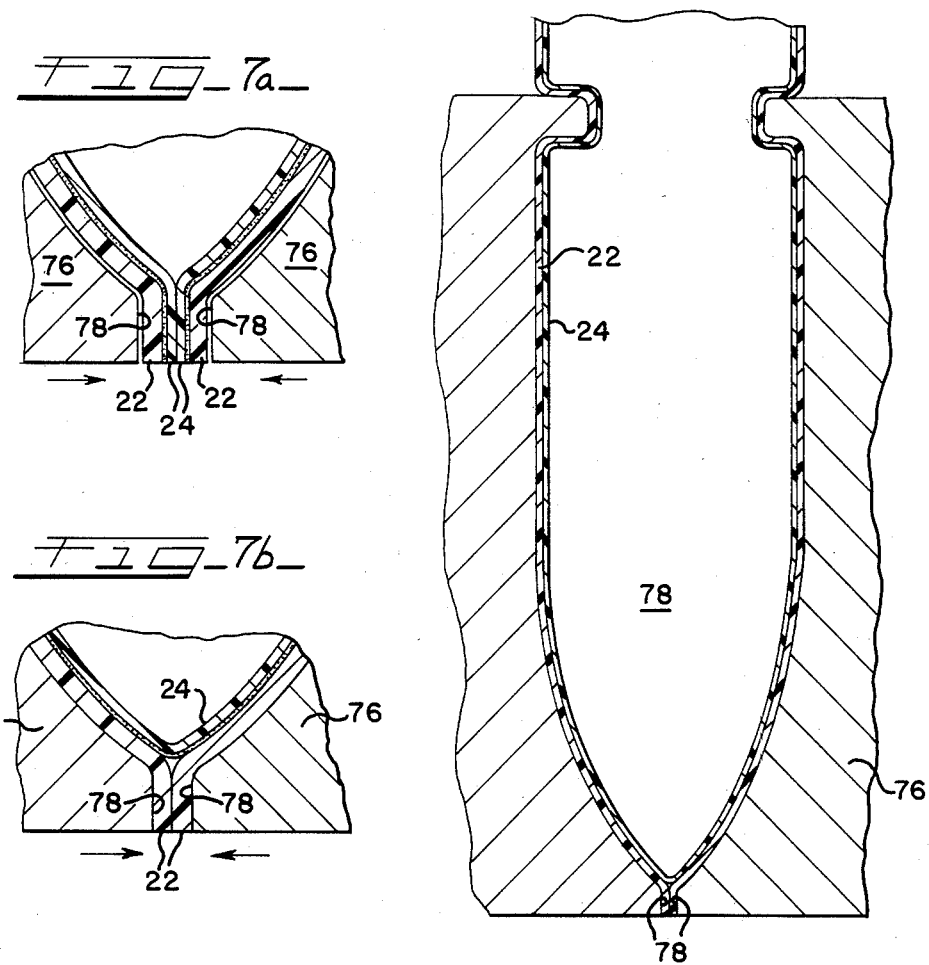
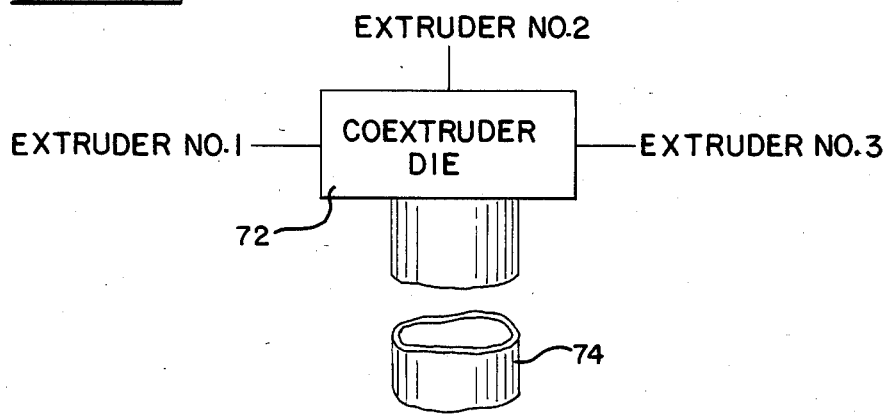

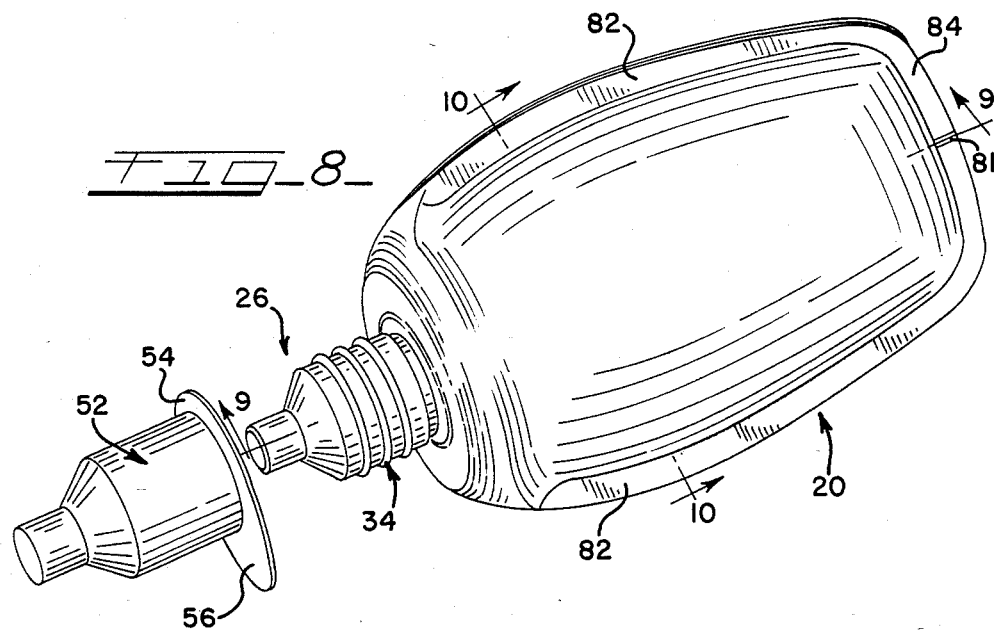
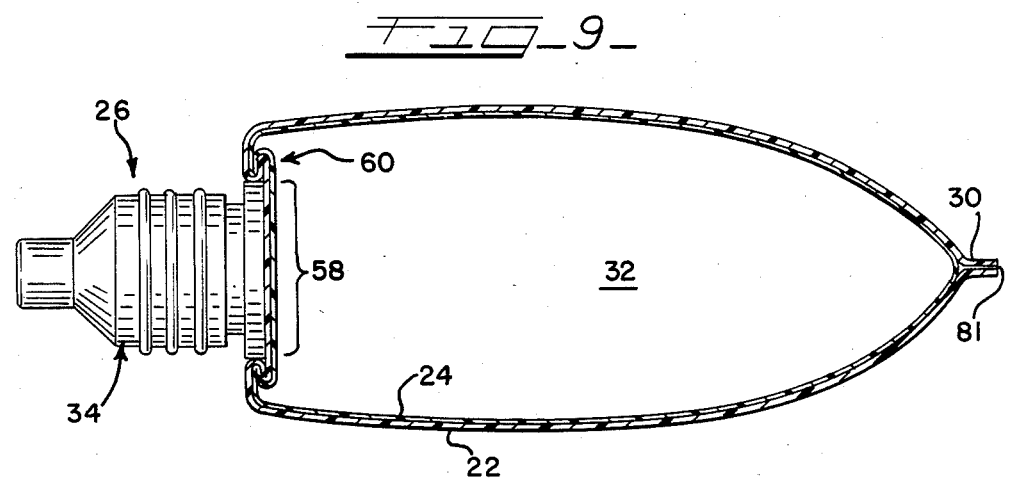
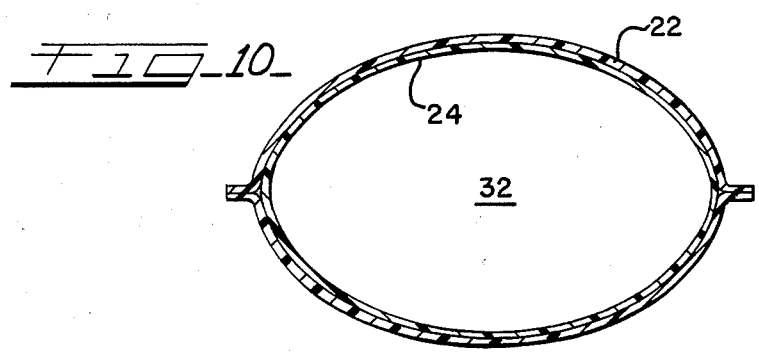

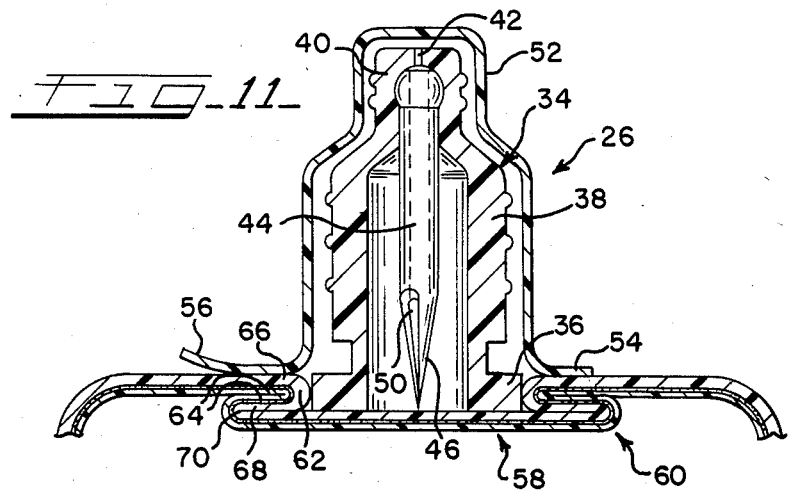
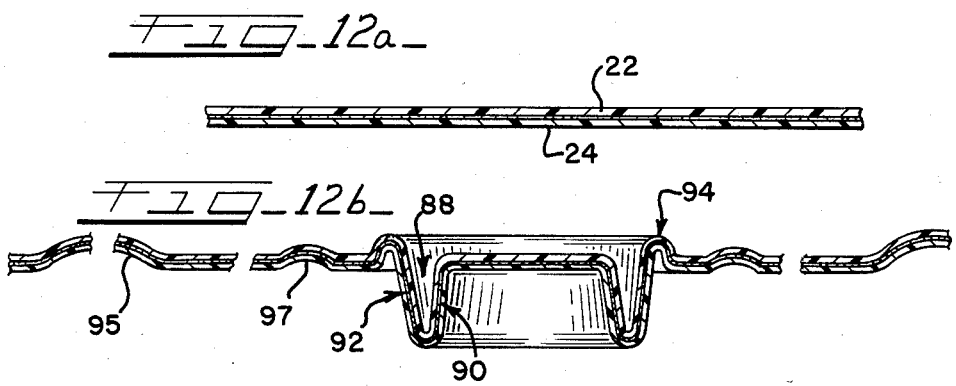
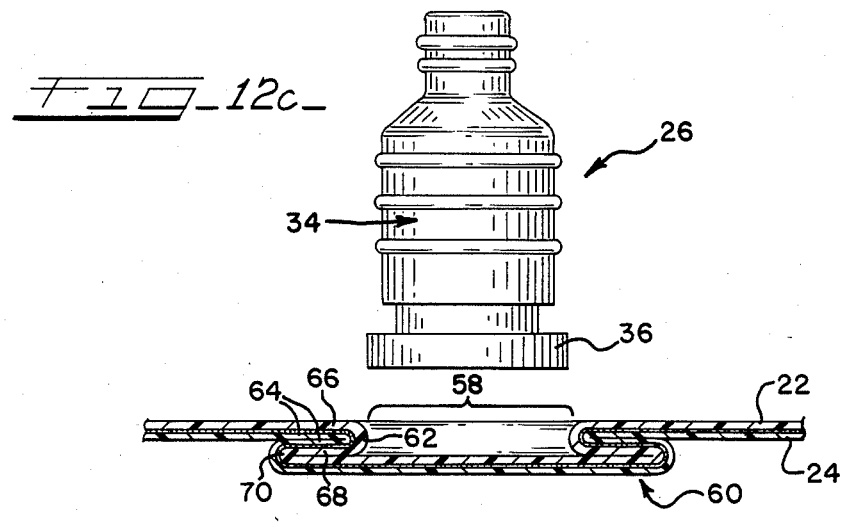

CONTAINER SUCH AS A NURSING CONTAINER, WITH FLEXIBLE LINER AND ACCESS SITE AND METHOD OF MAKING SAID ACCESS SITE

The present invention relates, in general, to nursing containers for feeding liquid to an infant. More particularly, the present invention relates to nursing containers of the type employing a flexible liner or pouch which is collapsible upon dispensing of the contents to an infant.

Nursing containers employing flexible liners or pouches have been proposed in a wide variety of shapes and configurations, as exemplified by U.S. Pat. Nos. 3,117,874 to Horan; 3,537,225 to Fields; 2,628,909 to Horan; and 3,790,017 to Fitzpatrick et al. Perhaps the most well known of these is the type of nurser shown in Fitzpatrick. The nurser depicted there employs a reusable rigid sleeve or tube and a disposable plastic liner which may be secured to the end of the tube and held in place by a resilient nipple. While avoiding many of the difficulties associated with rigid containers, the most well known of which is the requirement of displacement air within the container to dispense the contents and possible infant ingestion of that air such nursers, because they are not sterile, generally must be prepared on an as-needed basis, and require a substantial amount of manual assembly and preparation. Although this may be suitable for the home, is not convenient or preferred for institutional environments such as hospitals and nurseries.

Other proposed flexible nursing containers have different shortcomings. For example, U.S. Pat. Nos. 3,537,225 and 3,386,604 to Fields disclose a disposable infant container, and a relatively complex method for making it, where the nipple is actually formed into the container wall, and must be opened by piercing the nipple with a pin or similar instrument. For apparent protection during storage and shipment, after the pouch is filled and sealed, its enclosed in an outer container or overpouch in an entirely separate operation. The pouch disclosed in Fields may be workable, however, it is believed that the pouch is not generally practical, and is not well suited to home or institutional use. Moreover, the two-stage manufacturing process to make the pouch and outer cover is complicated, and likely to result, it is believed, in a relatively costly product.

It is, accordingly, a general object of the present invention to provide a nurser and a method of making a nurser which does not suffer from the drawbacks described above.

It is a further object of the present invention to provide a nurser which employs a generally flexible fluid compartment wall that collapses as liquid is dispensed and does not require the entry of displacement air into the container for dispensing to an infant.

It is a further object of the present invention to provide an infant nurser which is pre-filled and sterilized for institutional convenience and improved shelf life.

It is a further object of the present invention to provide such a container which includes at least a semi-rigid outer shell portion for protecting and supporting the flexible liner as well as for handling convenience.

It is a further object of the present invention to provide such a container with a nipple access site for accessing the contents of the container.

It is yet a further object of the present invention to provide a convenient and low cost method for making such a container and access site.

These and other objects and advantages of the present invention are achieved in a nursing container which has a substantially continuous outer semirigid or rigid plastic shell, a flexible plastic liner interior of the shell and substantially coextensive therewith, a quantity of liquid, such as infant formula or water, within the liner, and a nipple assembly secured to the shell and adapted to provide communication to the otherwise sealed plastic liner. An intentionally and selectively weak or temporary bond is provided between the liner and shell to permit separation of the liner from the shell subsequent to formation of the nursing container, and upon dispensing of the liquid contents from within the liner. The bond between the liner and shell may be provided by a selected low tensile strength adhesive between the liner and shell materials, or by natural adherence between the plastic materials of the shell and liner or by electrostatic attraction between the shell and liner. Such a container is specifically described and claimed in co-pending application Ser. No. 599,302, entitled "Container Such As A Nursing Container, With Flexible Liner And Method Of Making Same" to J. Cabernoch which is being filed simultaneously herewith.

Preferably, the shell and liner are coextruded or laminated together in the bonded condition, and it is only necessary that they adhere during fabrication of the nursing container. After the container is formed, filled and sealed, it is not necessary that the liner and shell remain bonded together. Thus, a degradable adhesive may also be used between the shell and liner to permit subsequent separation. In either embodiment, the resulting container provides a pre-filled pre-sterilized infant nurser which is particularly convenient to use, does not require substantial on-site preparation, and has the advantage of a flexible liquid container which permits dispensing of the contents to an infant without requiring displacement air.

In these embodiments, the contents may be accessed by a nipple assembly attached to the shell which includes accessing means movable upon manipulation of the nipple assembly to pierce the wall of the container shell and liner. In accordance with the present invention, to prevent contents from escaping into the area between the shell and liner when they are pierced, a special nipple access site provided in the container wall where the liner is tightly sealed to the shell. Preferably, the nipple access site is defined by an annular fold formed in the container wall which captures the liner mechanically to seal it to the shell around the periphery of the access site and prevent liquid from flowing back between the liner and shell and hold the liner tightly to assure pentration by the nipple access member.

The present invention is not limited to a nursing container but may also be a container having an access assembly for delivery of a contained fluid in a manner such that the flexible liner collapses and such that the entry of displacement air is not required.

These and other objects and advantages of the present invention are set forth in the following detailed description of the attached drawings which depict various embodiments of the present invention for the purposes of illustration, and not limitation, and of which:

FIG. 1 is a perspective view of a nursing container with dispensing nipple and cover, in a removed position, embodying the present invention.

FIG. 2 is a longitudinal cross-sectional view of the container of FIG. 1, taken along line 2—2 of FIG. 1.

FIG. 3 is a cross-sectional view of the container of FIG. 1 taken along line 3—3 of FIG. 1.

FIG. 4 is a cross-sectional view of the container of FIG. 1, illustrating dispensing of the contents through the nipple assembly, and collapse of the liner wall as the contents are dispensed.

FIG. 5 is a diagrammatic illustration of the coextrusion of a plastic parison having a rigid outer layer and a flexible inner layer weakly adhered together for use in the present invention.

FIG. 6 is a vertical cross-sectional view of molding apparatus for forming a coextruded parison into the desired nursing container.

FIGS. 7a and 7b are enlargements of the lower end portion of the molds of FIG. 6, depicting sealing of the parison walls together by the molds.

FIG. 8 is a perspective view of an alternative embodiment of the nursing container of the present invention, which is formed by folding a generally planar sheet of coextruded or laminated plastic to form a generally pouch shape.

FIG. 9 is a longitudinal sectional view of the container of FIG. 8 taken along line 9—9 of FIG. 8.

FIG. 10 is a cross-sectional view of the container of FIG. 8 taken along line 10—10 of FIG. 8.

FIG. 11 is an enlarged cross-sectional view of the nipple assembly and the end of the container of FIG. 8 to which the nipple assembly is attached, showing a nipple assembly access site on the container.

FIGS. 12a–12c depict a method for forming a nipple access site in the container wall.

Referring now to the drawings in general, the present invention is generally embodied in a nursing container 20 having an outer rigid plastic shell or layer 22, an inner flexible liner 24 in which liquid 28, which may be an infant formula, water or the like, is contained and a nipple assembly 26 attached to the shell. In accordance with the present invention, the liner 24 is substantially coextensive with the outer shell 22 and weakly or temporarily bonded thereto, the bond being sufficiently weak or degradable to permit collapse of the inner liner wall as contents are dispensed to an infant. This construction provides a sealed unitary container which may be aseptically filled or filled and subsequently sterilized to provide long shelf life, while simultaneously having the convenience and benefits of a flexible container which does not require the entry of displacement air for dispensing the contents to an infant.

The liner and shell may be weakly or temporarily bonded together in various ways. Preferably a low tensile strength adhesive is coextruded or laminated between the liner and shell. Alternatively, the layers may be held together by a natural adherence of the materials used for the liner and shell, or by an electrostatic attraction between the shell and liner. Yet a further alternative is the use of a degradable adhesive which holds the liner and shell together during fabrication but releases them later when the adhesive degrades. The degradation process may occur by way of time, or may be accelerated by exposure to heat or ultraviolet light, depending on the particular adhesive used.

The container of the present invention may be formed, for example, by coextruding a parison having an inner plastic layer corresponding to the container liner, an outer layer corresponding to the container shell, and a layer of selected adhesive or plastic therebetween. The parison may then be molded, such as by blow molding, to form the desired container shape, and the nipple assembly then attached to the end of the container. Alternatively, the container may be formed of a generally planar coextruded or laminated sheet which is folded together and sealed on the sides and end to form a generally pouch-shaped container.

In either alternative, the sealed seams of the container are preferably formed in a manner which is depicted in FIGS. 7a and 7b. As shown there, the plastic film is compressed together along the seam, until the portion forming the liner is forced from between the shell-forming layers, which then seal together. This sealing technique thus permits collapse of the inner liner from all directions, rather than simply a collapse of opposed portions of the liner together.

Turning now to a more detailed description of the drawings, FIG. 1 depicts one embodiment of the nursing container embodying the present invention, as it might be formed by blow molding a parison. The shell and liner form a generally cylindrically shaped container, which mounts the nipple assembly 26 at one end, and is sealed along a tail seal 30 at the other end. The shell and liner preferably form a unitary closed liquid compartment 32 within which the liquid formula, water or other liquid for infant feeding is contained. The liner 24 is disposed along substantially the entire inner surface of the shell 22, in other words, is co-extensive with the shell. The liner 24 is preferably made of a relatively thin plastic film sufficiently flexible to collapse under the vacuum created by dispensing of liquid from the compartment 32. Preferably the liner is inert to infant nutritional liquid, and may be made of materials such polyethylene, or a laminate of polyethylene and polyvinylchloride and the like. While the liner may be made of a single layer of such material it may also be made of a composite material or a laminated film which includes an oxygen barrier to prevent substantial oxygen transmission to the liquid container in the compartment, thereby improving shelf life.

The shell 22 is also made of plastic material, and preferably a material which, when cooled, provides a semirigid or rigid protective shell for the liner 24. The shell 22 is preferably sufficiently thick to prevent inadvertent puncture of the liner during shipping and storing, as well as to provide an oxygen barrier to prevent substantial access of oxygen to the liquid contained within the liner. As with the liner, the shell 22 may be made of a single material or may be a laminated or composite material including an oxygen barrier material, such as Saran plastic. Among the many materials suitable for shell material are polypropylene, polyethylene, and high impact polystyrene.

In accordance with the present invention, the liner and shell are formed, for example, by coextrusion or lamination, to have a selectively weak adherence which will hold the layers together at least during container formation, but permit the liner to collapse when the contents of the container are dispensed. To achieve this, the adhesive material preferably has a very low tensile strength to permit separation of the liner and shell upon dispensing of the contents. For example, with a high impact polystyrene shell and a two layer laminated liner of polyvinyldichloride and medium density polyethylene, a suitable low bond strength adhesive layer, such as an ultra low molecular weight polyethylene may be provided between those materials. A wax-based adhesive layer which permits ready separation of liner and shell and also may be weakened upon heating of the container contents prior to feeding of the infant, may also be used.

Alternative means for adhering the liner to the shell include the use of an adhesive, the bond strength of which diminishes or weakens when exposed to certain conditions. One advantage of such adhesive material is that it permits a very strong bond during formation of the container and the manufacturing steps involved therewith, yet provides that the liner is completely unbonded or unadhered to the shell by the time it is put to use. Various types of degradable materials, which degrade under different conditions, may be used in accordance with the present invention. For example, some adhesives may degrade with age, or with the application of heat such as occurs in autoclave sterilization. In another type of adhesive, the degradation is activated by exposure to ultraviolet light. Employing this adhesive, the finished container would be exposed to ultraviolet light when manufacturing was complete, starting the degradation process which would permit the liner to readily separate from the shell when eventually used.

An alternative means for adhering the shell and liner together is electrostatic force, wherein a selected electrostatic charge is applied to each of the shell and the liner, resulting in attraction therebetween which is sufficient to permit the shell and liner to adhere together at least during manufacturing processing.

The container formed by the shell and liner is preferably a unitary sealed compartment, which may be either aseptically filled or filled and subsequently sterilized. Yet it provides the convenience and safety of a collapsible liner, which permits the contents to be dispensed without leakage or fear of air ingestion by the infant.

For dispensing the contents, the nipple assembly 26 is sealed to one end of the container and includes integral means for accessing the contents by piercing the container wall. One type of nipple assembly suitable for use with the present invention is depicted, in cross-section, in FIG. 11. As seen there, the nipple assembly 26 includes a flexible nipple 34 preferably made of elastomeric material, such as thermoplastic rubber, Kraton G plastic of the Shell Chemical Company, silicone, or other material. The nipple 34 has a generally radial base flange 36 which is sealed to the outer shell 22. The nipple 34 has a side wall 38 upstanding from the base flange, and terminating in a narrower dispensing end portion 40 of the nipple, which has a dispensing aperture of 42 therein. The inside surface of the dispensing end of the nipple is generally spherical, to capture the spherical end of a puncturing spike 44 disposed within the nipple. As shown in FIG. 11, the spike 44 is in a retracted position where it remains until the contents of the container must be accessed. At that time, the spike is forced through the container wall either by squeezing the dispensing end 40 of the nipple or by axially compressing of the nipple.

The puncturing spike 44 is generally elongated and hollow, terminating in a tapered lower end 46. The spike has an interior passageway extending upwardly through the center of the spike and communicates through the lower end of the spike with elongated side apertures 50.

A cross-sectional view of the container alone, showing the opening spike in an extended liquid-accessing position is illustrated in FIG. 4. That Figure demonstrates the initial collapsing of the container walls as liquid is dispensed to an infant through the nipple. A more detailed description of the nipple assembly 26 used in the present invention and alternative embodiments of such nipple assembly is contained in co-pending U.S. application Ser. No. 599,305, entitled "Self-Opening Nipple Construction and Nursing Container", in the name of Leonard A. White, which is being filed simultaneously herewith.

For protecting the nipple assembly 26 in shipment and storage, and for preserving the sterility of the nipple surface, a cover 52 is preferably sealed over the nipple. As shown in FIGS. 1, 8 and 11, the cover 50 is generally of rigid platic construction, and includes a generally radial bottom flange 54 which is heat sealed to the upper surface of the container shell 22. Preferably, the heat seal between the flange 54 of the cover and the shell is frangible to permit easy removal of the cover by exerting a force on pull tab 56 of the cover.

Although the nipple assembly 26 may be secured to the container in a variety of ways, FIGS. 1-3 depict a mechanical attachment of the nipple assembly to the end of container. As shown in FIGS. 2 and 3, bottom flange 36 of the nipple assembly is mechanically captured, and preferably thermally bonded, to the container wall. More particularly, the container has a reduced diameter portion 57 which forms a radial shoulder 59 that the nipple flange engages against. Preferably the materials of the nipple and container wall are sufficiently compatible that the flange may be thermally bonded to the wall. To assure attachment to the container, the end portion 61 of the container wall is formed, as by heat swaging, or other suitable method, to tightly lock the nipple to the container. In this embodiment a separate membrane 63 may be sealed to the underside of the nipple flange to isolate the nipple and spike from the container contents and prevent leakage during shipping and storing.

FIGS. 5-7b depict one method by which a container embodying the present invention may be constructed. Diagrammatically shown in FIG. 5 is a coextruder die 72 of a type well known in the art for extruding a plastic parison 74 comprising layers of various plastics and other materials fed to the coextruder from extruders nos. 1, 2 and 3. For example, extruder no. 1 could be the extruder for the plastic material forming the rigid shell 22. Extruder no. 3 would be the extruder for the plastic material forming for the flexible liner material 24, and extruder no. 2 would be the extruder for the adhesive or bonding material, if any, between the liner and shell. To actually form a container of the desired shape, the parison 74 is positioned, either directly from the coextruder, or after cooling and reheating, between a pair of molds 76 (FIG. 6), which, when joined, define a mold cavity 78 of the desired container shape. The parison is expanded to conform to the cavity shape by injecting compressed air, or applying a vacuum to the wall of the parison, or a combination of both. As shown in FIG. 6, the lower end of the molds 22 have pinch edges 80 which close substantially together when the mold closes, to form the tail seal 30 of the container. Of course, the bottom of the container could remain open for filling and be subsequently closed by a heat sealing operation similar to that described hereinafter. Also, the nipple assembly may be sealed to the container either in place within the mold, or subsequent to cooling. Preferably apparatus, not shown, is employed with the mold subsequently to form the annular nipple access site on the end of the container. Also, means such as a retractable pin may be utilized to form small port 81 (FIGS.

1-3) in the outer shell only, which allows air to enter the shell as the contents are dispensed and the liner collapses.

FIGS. 7a and 7b depict the formation of the tail seal 30 of a container of the present invention, formed by blow molds 76. FIG. 7a depicts the lower edges 80 of the molds coming together and compressing the end of the container together. In that position, the inner liner 24 has come into contact between the tail seal portions of the outer shell 22. As the molds close completely, the portion of plastic material forming the inner liner is forced from between the shell portions, as shown in FIG. 7b. With this construction, the end portion of the liner at the seal is not trapped between the joined shell portions, and thus the entire liner is collapsible toward the dispensing nipple as liquid flows therefrom. Although this is not required for satisfactory container operation, it is considered desirable.

An alternative embodiment of the nursing container, is disclosed in FIGS. 8-10, which depict a container formed from a generally flat sheet of plastic material coextruded or laminated of a shell layer 22 and a liner layer 24. To form the container depicted in FIG. 8, the nipple assembly 26 is attached generally to the center of the sheet (not shown) and the sheet is folded until the end portions of the sheet meet. The lateral edges of the sheet are sealed along lines 82, leaving the end opposite the nipple open for filling. Upon completion of filling, the end of the container is closed and sealed at 84, thereby providing a complete sealed unitary container and nipple assembly arrangement. Preferably, the lateral seals 82 and end seal 84 of the container of FIG. 9 are carried out in a manner such as that previously depicted and described in FIGS. 7a and 7b, which force the liner portion from between the shell, to permit collapse of the liner in all directions as liquid is dispensed through the nipple assembly 26.

Because the inner liner is intentionally easily separable from the shell, in other embodiment of the container, such as that depicted in FIGS. 8-10, the nipple assembly 26 is preferably attached to the shell at an access site in accordance with the present invention, which will permit a puncturing member to access the container, without causing delamination of the liner and shell in that area which would permit liquid contents to escape into the space between the liner and shell. To prevent this, the nipple is attached to an access site, generally designated 58 at the end of the container. While the access site may be provided by utilizing a permanent adhesive or bonding between the shell and liner in that area of the container, the access site is preferably defined by a generally annular fold 60 in the container wall which tightly entraps the liner and seals it to the shell peripherally around the access site so that liquid cannot escape into the space between the liner and shell. More particularly, the fold, as shown in enlarged cross-section in FIG. 11, is actually formed by a pair of 180° folds in opposite directions, so as to define a generally S-shaped cross-sectional configuration. As shown in FIG. 11, the container wall is folded through 180° at 62 to bring the liner portions 64 into a generally face-to-face relationship and tightly trap them between the facing shell portions 66 and 68. A return 180° fold of the container wall is provided at 70 such that the container wall continues in the original direction. Thus, although the portion of inner liner may delaminate or separate from the shell in the immediate area of the access site enclosed by the annular fold, the capture of the inner liner between folded portions of the shell mechanically seals the liner to the shell and prevents liquid from entering the space between the liner and the shell.

Otherwise, the construction of the container shell 22 and liner 24 of FIG. 8, the particular materials involved, and the operation of the nipple assembly, is essentially the same as that for the embodiment depicted in FIGS. 1-4, and thus, for convenience, will not be repeated.

FIGS. 12a-12c depict the preferred method for forming the nipple access site and container in a sheet, to form the container depicted in FIG. 9. A portion of the sheet, having a laminated or coextruded shell layer 22, liner layer 24 weakly temporarily bonded together is depicted in FIG. 12a prior to any of the formation steps for defining an access site.

In the first step of the process to define a nipple access site, a generally annular V-shaped groove 88, having an inner wall portion 90 and an outer wall portion 92, is formed in the sheet, such as by thermoforming, circumscribing the intended nipple access site 58. The V-shaped groove is preferably defined to protrude toward the liner side of the sheet, i.e., downwardly in FIG. 12b. The walls 90 and 92 forming the V-shaped groove are then heat-swaged in a radially outward direction, capturing the portions 64 of the liner tightly between adjacent folded portions 66 and 68 of the shell. To accommodate the folding arrangement, a generally raised rib 94 is preferably formed adjacent and outwardly of the V-shaped groove, so as to better define fold line 62 of the container wall during the swaging operation. Simultaneously with or subsequent to formation of the access site, clam-shell shaped sidewall portions 95 are thermoformed into the sheet. After the swaging operation is complete, the nipple 34 is then heat-sealed to the shell at the access site circumscribed by the annular fold, and the clam-shell sides are folded together along thermoformed dimple 97 and the sides 82 sealed together. The end 84 remains open temporarily for filling, and after filling is sealed to provide a unitary sealed container.

Although the present invention has been defined in terms of the preferred alternative embodiments, the present invention, as defined in the appended claims, includes those equivalent structures which may be readily apparent, or which may be apparent to persons skilled in the art only after some study.

What is claimed is:

1. A nursing container comprising:
   a substantially rigid outer shell;
   a co-extensive flexible inner liner selectively adhered to said outer shell and separable therefrom;
   a nipple access site defined in said shell and liner;
   a nipple assembly sealed to said container at said access site;
   said access site being defined by a continuous circumferential fold in said shell and liner tightly capturing said liner to prevent inadvertent delamination of said liner outwardly of said fold upon rupture of said access site.

2. A nursing container in accordance with claim 1 further comprising a dispensing nipple assembly attached to said access site and including means for rupturing said access site upon manipulation of said nipple assembly.

3. A nursing container in accordance with claim 1 wherein said fold comprises at least one fold of said wall portion to define two segments of said wall portion in overlying relationship with a portion of said liner captured in a face-to-face relationship therebetween.

4. A nursing container in accordance with claim 1 wherein said fold is cross-sectionally S-shaped.

5. A nursing container in accordance with claim 4 wherein said S-shaped fold is tightly compressed to secure said liner.

6. A method of providing a nipple access site in a nursing container wall portion comprising a substantially rigid outer plastic layer and a flexible inner plastic layer adhered to said outer layer and separable therefrom, comprising:
   forming a continuous groove in said wall portion inadvertent toward said flexible layer;
   folding the wall portion defining said groove to mechanically capture said inner layer therealong to define said access site in the area of said wall portion circumscribed by said folded wall portion.

7. A method in accordance with claim 6 wherein said groove is generally V-shaped, and said step of folding comprises swaging said the wall portion defining said groove into a generally flattened configuration.

8. A method in accordance with claim 7 further comprising forming a raised annular rib around said groove.

9. A method in accordance with claim 6 wherein said step of forming is conducted when said plastic is at an elevated termperature.

10. A method in accordance with claim 6 wherein said groove is generally V-shape.

11. A method in accordance with claim 6 further comprising a nipple assembly sealed to said outer plastic layer in the area of said wall portion circumscribed by said folded wall portion.

12. A method in accordance with claim 11 further comprising sealing a cover over said nipple assembly.

13. A container for fluid comprising:
   a substantially rigid outer shell;
   a co-extensive flexible inner liner selectively adhered to said outer shell and separable therefrom;
   an access site defined in said shell and liner;
   an access assembly sealed to said container at said access site;
   said access site being defined by a continuous circumferential fold in said shell and liner tightly capturing said liner to prevent inadvertent delaminatin of said liner outwardly of said fold upon rupture of said access site.

14. A container in accordance with claim 13 further comprising a dispensing member attached to said access site and including means for rupturing said access site upon manipulation of said dispensing member.

15. A container in accordance with claim 13 wherein said fold comprises at least one fold of said wall portion to define two segments of said wall portion in overlying relationship with aportion of said liner captured in a face-to-face relationship therebetween.

16. A container in accordance with claim 13 wherein said fold is cross-sectionally S-shaped.

17. A container in accordance with claim 16 wherein said S-shaped fold is tightly compressed to secure said liner.

18. A method of providing an access site in a container wall portion comprising a substantially rigid outer plastic layer and a flexible inner plastic layer adhered to said outer layer and separable therefrom, comprising:
   forming a continuous groove in said wall portion; and
   folding the wall portion defining said groove to mechanically capture said inner layer therealong to define said access site in the area of said wall portion circumscribed by said folded wall portion.

19. A method in accordance with claim 18 wherein said groove is generally V-shaped, and said step of folding comprises swaging said the wall portion defining said groove into a generally flattened configuration.

20. A method in accordance with claim 19 further comprising forming a raised annular rib around said groove.

21. A method in accordance with claim 18 wherein said step of forming is conducted when said plastic is at an elevated temperature.

22. A method in accordance with claim 18 wherein said groove is generally V-shaped.

23. A method in accordance with claim 18 further comprising an access assembly sealed to said outer plastic layer in the area of said wall portion circumscribed by said folded wall portion.

24. A method in accordance with claim 23 further comprising sealing a cover over said access assembly.

* * * * *